United States Patent
Van Dijk et al.

(10) Patent No.: US 8,410,766 B2
(45) Date of Patent: Apr. 2, 2013

(54) POWER SUPPLY CIRCUIT WITH SCALABLE PERFORMANCE AND METHOD FOR OPERATING THE POWER SUPPLY CIRCUIT

(75) Inventors: Luc Van Dijk, Kranenburg (DE); Peter Buehring, Hamburg (DE)

(73) Assignee: NXP B.V., Eindhoven (NL)

( * ) Notice: Subject to any disclaimer, the term of this patent is extended or adjusted under 35 U.S.C. 154(b) by 132 days.

(21) Appl. No.: 13/023,109

(22) Filed: Feb. 8, 2011

(65) Prior Publication Data

US 2012/0200276 A1     Aug. 9, 2012

(51) Int. Cl.
*G05F 1/40*     (2006.01)
(52) U.S. Cl. .................................. 323/282; 323/225
(58) Field of Classification Search ............... 323/225, 323/282–285, 351
See application file for complete search history.

(56) References Cited

U.S. PATENT DOCUMENTS

| | | |
|---|---|---|
| 6,404,172 B1 | 6/2002 | May |
| 7,804,282 B2 * | 9/2010 | Bertele .................... 323/222 |
| 8,089,253 B2 * | 1/2012 | Murtojarvi ................ 323/224 |
| 2006/0006850 A1 * | 1/2006 | Inoue et al. ................ 323/265 |
| 2009/0236917 A1 | 9/2009 | Bettenwort et al. |
| 2011/0234187 A1 * | 9/2011 | Brown et al. ............... 323/282 |
| 2012/0001610 A1 * | 1/2012 | Klein ........................ 323/284 |

FOREIGN PATENT DOCUMENTS

EP     19261999 A1     5/2008

OTHER PUBLICATIONS

European Search Report, EP 12150963, May 22, 2012.

* cited by examiner

*Primary Examiner* — Jessica Han

(57) ABSTRACT

A power supply circuit and a method for operating the power supply circuit are described. In one embodiment, a power supply circuit includes multiple power elements configured to convert an input voltage to an output voltage, a driver circuit coupled to the power elements and configured to drive the power elements, a regulator controller coupled to the power elements and configured to control the power elements for the conversion of the input voltage to the output voltage, and at least one bypass switch coupled to the power elements. The at least one bypass switch is used to bypass at least one of the power elements. Other embodiments are also described.

18 Claims, 4 Drawing Sheets

POWER SUPPLY CIRCUIT WITH SCALABLE PERFORMANCE AND METHOD FOR OPERATING THE POWER SUPPLY CIRCUIT

Embodiments of the invention relate generally to electrical systems and methods for operating the electrical systems and, more particularly, to power supply circuits and methods for operating the power supply circuits.

A power supply circuit converts an input voltage to a desired output voltage. The performance of the power supply circuit can be determined by evaluating characteristics or parameters of the power supply circuit, such as standby current consumption, load response, and noise level.

Conventional power supply circuits generally cannot offer scalable performance without significant increase in cost. In conventional power supply circuits, power elements are either entirely integrated in the power supply circuits or placed completely external to the power supply circuits. When the power elements are entirely integrated in the power supply circuits, the conventional power supply circuits do not include any external device to provide performance boost and the performances of the conventional power supply circuits are fixed. When the power elements are placed completely external to the power supply circuits, the conventional power supply circuits have the potential to allow some scalability in performance. However, the external power elements increase the manufacturing cost of the power supply circuits. For example, the external power elements need extra package, incur more cost during module production and require additional module test time for verifying soldering connections. In addition, the circuit area size of the external power elements cannot be easily optimized. Furthermore, the electromagnetic compatibility (EMC) optimization of the external power elements usually cannot be easily performed.

A power supply circuit and a method for operating the power supply circuit are described. In one embodiment, a power supply circuit includes multiple power elements configured to convert an input voltage to an output voltage, a driver circuit coupled to the power elements and configured to drive the power elements, a regulator controller coupled to the power elements and configured to control the power elements for the conversion of the input voltage to the output voltage, and at least one bypass switch coupled to the power elements. The at least one bypass switch is used to bypass at least one of the power elements. Other embodiments are also described.

In an embodiment, a power supply circuit includes four power elements configured to convert an input voltage to an output voltage, a driver circuit coupled to the four power elements and configured to drive the four power elements, a regulator controller coupled to the four power elements and configured to control the four power elements for the conversion of the input voltage to the output voltage, a first bypass switch and a second bypass switch. The first bypass switch is connected in parallel with only a first power element of the four power elements and is used to bypass the first power element. The second bypass switch is connected in parallel with only a second power element of the four power elements and is used to bypass the second power element.

In an embodiment, a method for operating a power supply circuit involves selecting a buck operational mode or a boost operational mode for the power supply circuit, in the buck operational mode, converting an input voltage to an output voltage that is lower than the input voltage using a plurality of power elements of the power supply circuit, in the boost operational mode, converting the input voltage to the output voltage that is higher than the input voltage using the power elements, and bypassing at least one of the power elements using at least one bypass switch.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
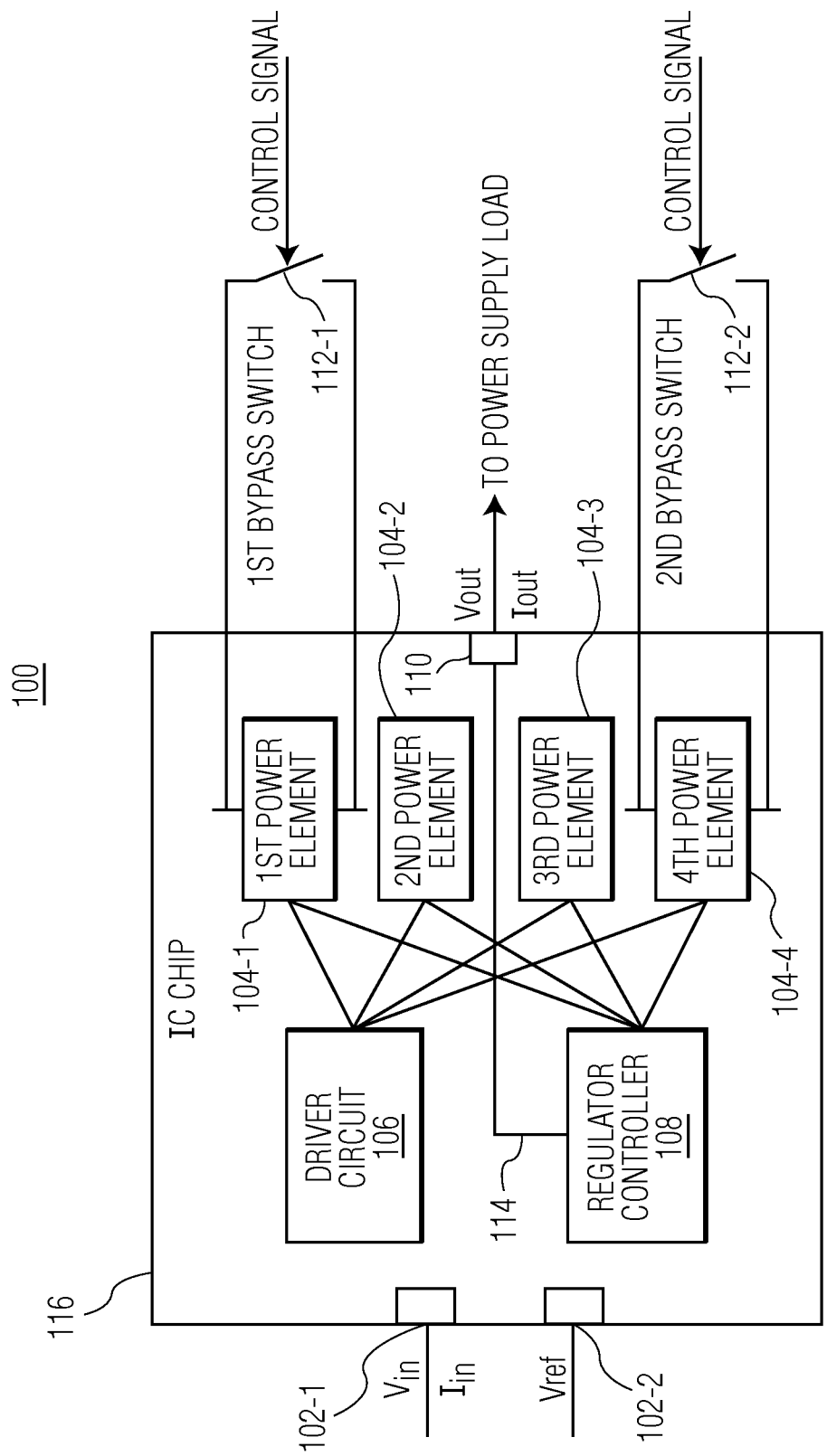
FIG. 1 is a schematic block diagram of a power supply circuit in accordance with an embodiment of the invention.

FIG. 1 is a schematic block diagram of a power supply circuit 100 in accordance with an embodiment of the invention. The power supply circuit may be used for various devices and applications, such as computers, industrial machineries, and household appliances. In some embodiments, the power supply circuit is used for an automotive application. For example, the power supply circuit is used in body controllers, anti-lock braking systems (ABS), electronic stability control systems, engine management systems, gearbox systems, electronic power steering systems and electronic air suspension control systems of motor vehicles.

In the embodiment depicted in FIG. 1, the power supply circuit 100 includes a first input terminal 102-1, a second input terminal 102-2, a first power element 104-1, a second power element 104-2, a third power element 104-3 and a fourth power element 104-4. In addition, the power supply circuit includes a driver circuit 106, a regulator controller 108, an output terminal 110, a first bypass switch 112-1 and a second bypass switch 112-2. The power supply circuit is configured to receive an input signal with an input voltage signal with an input voltage "$V_{in}$," and an input current "$I_{in}$" and generate an output signal with an output voltage "$V_{out}$" and an output current "$I_{out}$." Although the power supply circuit is depicted and described with certain components and functionality, other embodiments of the power supply circuit may include fewer or more components to implement less or more functionality. For example, the power supply circuit may include any number of input terminal(s), any number of power element(s), any number of driver circuit(s), any number of regulator controller(s), any number of output terminal(s) and/or any number of bypass switch(es).

The first input terminal 102-1 of the power supply circuit 100 is used to receive the input voltage "$V_{in}$." The second input terminal 102-2 is used to receive a reference voltage "$V_{ref}$." In an embodiment, the power supply circuit includes a built-in reference voltage source to provide the reference voltage $V_{ref}$. In this embodiment, the power supply circuit may not include the second input terminal. Although the power supply circuit is shown in FIG. 1 as receiving one input voltage $V_{in}$ and one reference voltage $V_{ref}$, the power supply circuit may receive more than one input voltage and/or more than one reference voltage in other embodiments.

Figure 2:
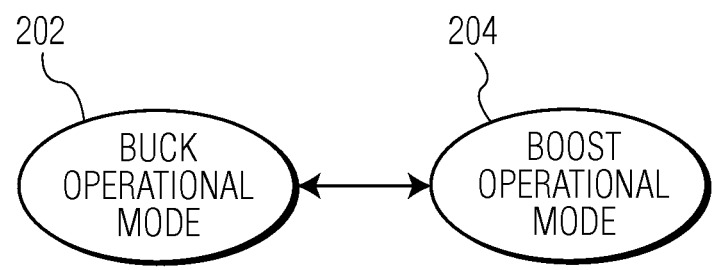
FIG. 2 illustrates a state machine diagram of the switched mode power supply depicted in FIG. 1.

In the embodiment depicted in FIG. 1, the power supply circuit 100 can be configured to operate in different operational modes. FIG. 2 illustrates a state machine diagram of the power supply circuit depicted in FIG. 1. In the state machine diagram of FIG. 2, the power supply circuit is configured to switch between a buck operational mode 202 and a boost operational mode 204. In the buck operational mode, the power supply circuit down-converts the input voltage $V_{in}$ to the output voltage $V_{out}$. That is, the output voltage $V_{out}$ of the power supply circuit is lower than the input voltage $V_{in}$ of the power supply circuit. In the boost operational mode, the power supply circuit up-converts the input voltage $V_{in}$ to the output voltage $V_{out}$. That is, the output voltage $V_{out}$ of the power supply circuit is higher than the input voltage $V_{in}$ of the power supply circuit. In an embodiment, the power supply circuit includes a monitoring module (not shown) configured to monitor the input voltage $V_{in}$ and to automatically select between the buck operational mode and the boost operational mode depending on the relationship between the input voltage $V_{in}$ and the desired output voltage level.

Turning back to FIG. 1, the first, second, third and fourth power elements 104-1, 104-2, 104-3, 104-4 of the power supply circuit 100 are configured to convert the input voltage $V_{in}$ to the output voltage $V_{out}$. At least one of the power elements may be a switching and/or rectifying element such as an NMOS transistor, a PMOS transistor, an NPN bipolar junction transistor, or a PNP bipolar junction transistor, or a diode such as a Schottky diode. In an embodiment, only some of the four power elements perform voltage conversion functions in the buck operational mode 202 and in the boost operational mode 204. For example, only the first and second power elements perform voltage conversion functions in the buck operational mode. In the buck operational mode, the third and fourth power elements do not perform voltage conversion functions. In this example, only the third and fourth power elements perform voltage conversion functions in the boost operational mode. In the boost operational mode, the first and second power elements do not perform voltage conversion functions. The power supply circuit may exclusively operate in only one of the buck operational mode and the boost operational mode. In addition, the operational mode(s) that is/are supported by the power supply circuit may be dependent on the number of power elements included in the power supply circuit. In some embodiments, the power supply circuit may include fewer than four power elements and implement only one of the buck operational mode and the boost operational mode. For example, the power supply circuit may include only the first and second power elements and implement only the buck operational mode. In another example, the power supply circuit may include only the third and fourth power elements and implement only the boost operational mode.

In an embodiment, the power supply circuit 100 is a switched mode power supply. In this embodiment, the power supply circuit includes additional circuit elements such as at least one capacitor and at least one inductor. As a switched mode power supply, the power supply circuit operates to convert an input voltage to an output voltage by switching the current running through the inductor.

The driver circuit 106 of the power supply circuit 100 is coupled to the power elements 104-1, 104-2, 104-3, 104-4 and configured to drive the power elements. The regulator controller 108 of the power supply circuit is coupled to the power elements and configured to control the power elements for the conversion of the input voltage $V_{in}$ to the output voltage $V_{out}$. In an embodiment, the regulator controller is further configured to select the buck operational mode 202 or the boost operational mode 204 for the power supply circuit. The regulator controller may be a digital circuit or an analog circuit. Although the regulator controller is depicted in FIG. 1 as being external to the power elements, in other embodiments, the regulator controller is integrated within the power elements.

The output terminal 110 of the power supply circuit 100 is used to output at least one output signal with the output voltage $V_{out}$ and the output current $I_{out}$. The output signal may be applied to a load of the power supply circuit, such as a component of a motor vehicle. Although the power supply circuit is shown in FIG. 1 as outputting a single output voltage $V_{out}$, the power supply circuit may output more than one output voltages in other embodiments.

In the embodiment depicted in FIG. 1, the power supply circuit 100 includes a feedback loop 114 that connects the output terminal 110 to the regulator controller 108. The feedback loop is used to regulate the output voltage $V_{out}$ to a desired output voltage. The feedback loop may include one or more resistors (not shown). In some embodiment, the power supply circuit does not include any feedback loop that connects the output terminal to the regulator controller.

The bypass switches 112-1, 112-2 of the power supply circuit 100 are coupled to the first and fourth power elements 104-1, 104-4 and are used to bypass the corresponding power elements. Specifically, the first bypass switch of the power supply circuit 100 is connected in parallel with the first power element and is used to bypass the first power element. The second bypass switch is connected in parallel with the fourth power element and is used to bypass the fourth power element. Each of the bypass switches is controlled by a control signal, which may be generated and/or transmitted from a driver circuit (not shown). In an embodiment, at least one of the bypass switches is implemented as a semiconductor transistor. In another embodiment, at least one of the bypass switches is implemented as a relay, i.e., an electrically operated switch. At least one of the bypass switches may be a switch with low resistor voltage coefficient (Rdson) and moderate/high current capability or a switch with high Rdson and low/moderate current capability. Although the power supply circuit is shown in FIG. 1 as including two bypass switches, the power supply circuit may include any number of bypass switch(es). For example, the power supply circuit may include only one bypass switch for only one of the two power elements 104-1, 104-4. Alternatively, the power supply circuit may include multiple bypass switches that are placed in parallel to one power element, e.g. to the power element 104-1 and/or the power element 104-4.

In the embodiment depicted in FIG. 1, the power elements 104-1, 104-2, 104-3, 104-4, the driver circuit 106 and the regulator controller 108 are located in or integrated within an integrated circuit (IC) chip 116. The bypass switches 112-1, 112-2 are not located in the IC chip. In other words, the bypass switches are located outside of or external to the IC chip.

Conventional power supply circuits generally cannot offer scalable performance without significant increase in cost. In conventional power supply circuits, power elements are either entirely integrated in the power supply circuits or placed completely external to the power supply circuits. When the power elements are entirely integrated in the power supply circuits, the conventional power supply circuits do not include any external device to provide performance boost. Thus, the performances of the conventional power supply circuits are fixed. When the power elements are placed completely external to the power supply circuits, the conventional power supply circuits have the potential to allow some scalability in performance. However, the external power elements need extra package, incur more cost during module production and require additional module test time for verifying soldering connections between the external power elements and the main body of the power supply circuit. Thus, the external power elements have high manufacturing costs. In addition, the size of the circuit area, such as the size of the printed circuit board (PCB), of the external power elements cannot be easily optimized. Furthermore, for switched mode power supplies, the interconnections between the fast switching external power elements can cause significant larger current loops than integrated power elements. As a result, the EMC optimization of the external power elements cannot be easily performed. Additionally, current mode switched mode power supplies require current sensing through the power elements, which is more difficult to realize when the power elements are external to the power supply circuits. For example, an additional shunt resistor, which incurs more cost during module production and requires additional module test time, may be used for current sensing. This shunt resistor can cause additional power losses, which reduces the efficiencies of the switched mode power supplies and can cause stability issues.

Using the bypass switches 112-1, 112-2, the power supply circuit 100 offers scalable performance without significant increase in cost. The power elements can provide sufficient basis performance in terms of output current capability. The scalability can be realized by enabling or disabling and/or by placing or not placing the bypass switches. In an embodiment, the bypass switches are switched on (closed) or off (open) only upon operational mode change of the power supply circuit. In other words, each of the bypass switches is only turned on or off at transitions between the buck operational mode 202 and the boost operational mode 204. While the power supply circuit is operating in the same operational mode, the on/off status of each of the bypass switches is not changed. In other words, the on/off status of each of the bypass switches is maintained at the same on/off status while the power supply circuit is operating in the same operational mode. Each bypass switch is used to bypass one internal power element that is not needed for the specific operational mode that the power supply circuit is currently running, i.e. the buck operational mode or the boost operational mode. When the power supply circuit is a switched mode power supply, the bypass switches are not actively switched with the frequency and duty cycle according to the current in the inductor of the switched mode power supply. In other words, the bypass switches do not support the high switching speed of the inductor current. Because the external bypass switches are only turned on or off at transitions between the buck and boost operational modes and do not switch at high frequency, the related driver circuit can be simplified and the EMC performance of the power supply circuit can be optimized. For example, when a bypass switch is implemented as a metal-oxide-semiconductor field-effect transistor (MOSFET), a high control current is no longer needed for providing fast charging or discharging of the gate-source capacitance of the MOSFET. In addition, the external bypass switches have significant EMC advantages for a user of the power supply circuit, such as an end customer. Specifically, because the external bypass switches do not switch at high frequency, the EMC optimization of the bypass switches can be easily performed. Furthermore, because the external bypass switches do not switch at high frequency, switching losses can be avoided. Additionally, while the bypass switches are removable, the scalability can be realized by adding or removing the bypass switches and/or by changing the types of the bypass switches. This allows a user of the power supply circuit, such as an end customer, to trade off the required performance with additional costs associated with the external bypass switches. As a result, the removable bypass switches allow cost optimization for low-end power supply circuit performance while providing the scalability option to achieve higher performance.

In an embodiment, the bypass switches 112-1, 112-2 improve the performance of the power elements 104-1, 104-2, 104-3, 104-4 in an operational mode 202, 204 through improving the effectiveness of the electrical insulation of the power elements that do not function in that operational mode. For example, only the first and second power elements perform voltage conversion functions in the buck operational mode. In the buck operational mode, the third and fourth power elements do not perform voltage conversion functions. In this example, only the third and fourth power elements perform voltage conversion functions in the boost operational mode. In the boost operational mode, the first and second power elements do not perform voltage conversion functions. However, the internal power elements are intentionally not made to realize effective electrical "shorts" to save die area in order to reduce manufacturing cost of the power elements. In the embodiment depicted in FIG. 1, in the buck operational mode, the fourth power element is configured in an electrical "short" state and the third power element is configured in an electrical "open" (non-conducting) state. In the boost operational mode, the first power element is configured in the electrical "short" state and the second power element is configured in the electrical "open" state. In the embodiment depicted in FIG. 1, the power supply circuit 100 includes two bypass switches 112-1, 112-2 that are placed in parallel with two corresponding power elements 104-1, 104-4, respectively. Each of the two bypass switch is used to provide a more effective shorting for a corresponding power element that is in the "short" state under an operational mode in which the power supply circuit is operating. The power supply circuit may include any number of bypass switch(es). For example, the power supply circuit may include one or more bypass switches that are placed in parallel with one or more corresponding power elements, which are in the "short" state under an operational mode in which the power supply circuit is operating, to provide more effectively shorting for the power elements. The number of bypass switch(es) is in the range between one and the total number of the power elements that are in the "short" state under an operational mode in which the power supply circuit is operating. When a user of the power supply circuit requires additional performance, at least one of the bypass switches can be switched on (closed).

Figure 3:
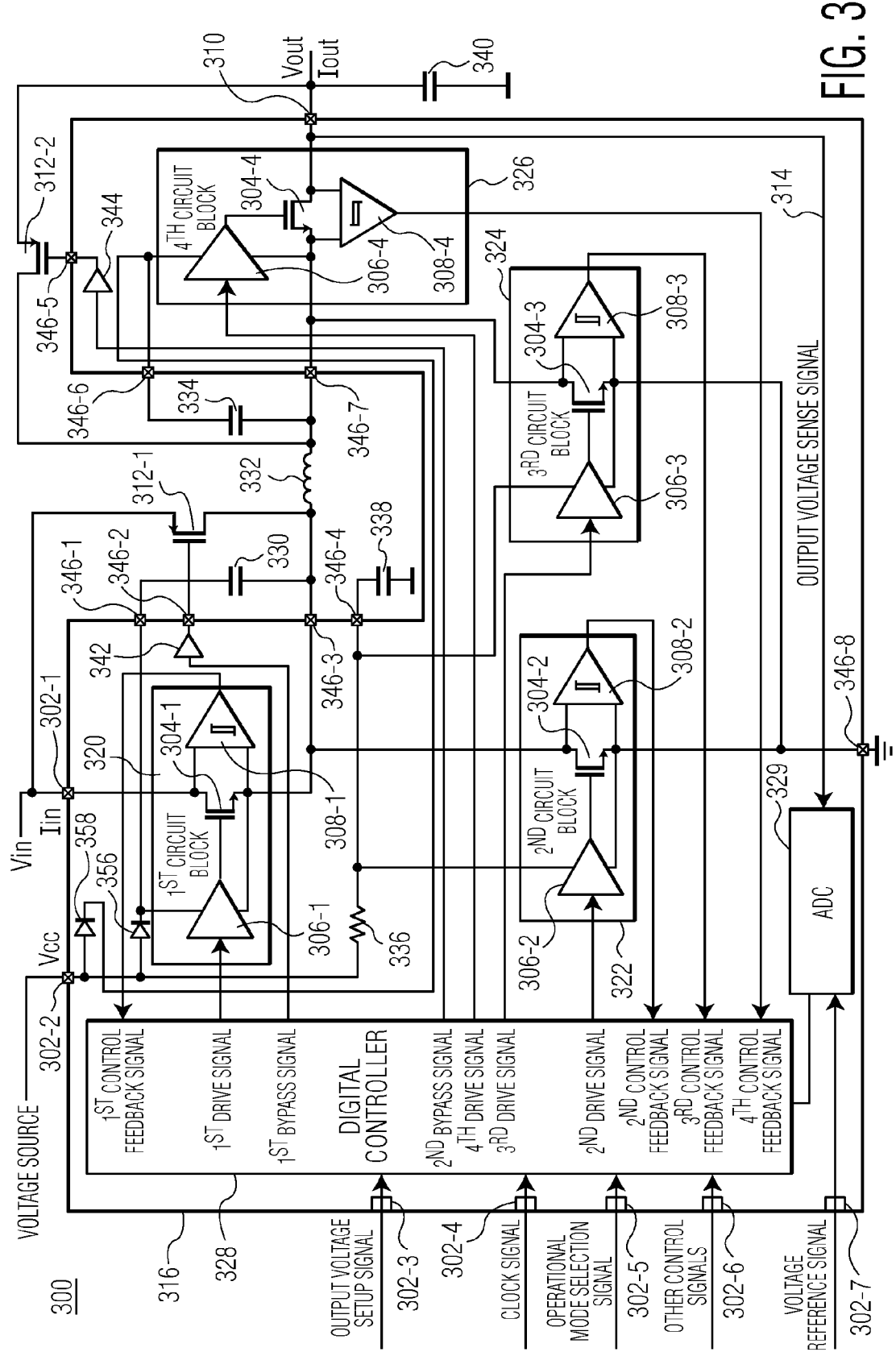
FIG. 3 depicts an embodiment of the power supply circuit of FIG. 1.

FIG. 3 depicts an embodiment of the power supply circuit 100 of FIG. 1. In the embodiment depicted in FIG. 3, the power supply circuit 300 is a switch mode power supply that includes a first circuit block 320, a second circuit block 322, a third circuit block 324, a fourth circuit block 326, a digital controller 328, an analog-to-digital converter (ADC) 329, a first bypass switch 312-1 and a second bypass switch 312-2. In addition, the power supply circuit includes a first switching capacitor 330, an inductor 332, a second switching capacitor 334, a resistor 336, a first grounding capacitor 338, a second grounding capacitor 340, a first bypass switch driver 342 and a second bypass switch driver 344. Furthermore, the power supply circuit includes input/output terminals 302-1, 302-2, 302-3, 302-4, 302-5, 302-6, 302-7, 346-1, 346-2, 346-3, 346-4, 346-5, 346-6, 346-7, 346-8, 310. As shown in FIG. 3, the first, second, third and fourth circuit blocks, the digital controller, the resistor, and the first and second bypass switch drivers are integrated in an IC chip 316. The first and second grounding capacitors, the first and second switching capacitors, and the inductor are located outside of the IC chip. The power supply circuit is configured to receive an input signal with an input voltage signal with an input voltage "$V_{in}$" and an input current "$I_{in}$" and generate an output signal with an output voltage "$V_{out}$" and an output current "$I_{out}$."

The first circuit block 320 of the power supply circuit 300 includes a first power element 304-1, a first driver circuit 306-1 and a first current measurement circuit 308-1, which is a peak current comparator that compares the measured current with a maximum (peak) current value. The second circuit block 322 includes a second power element 304-2, a second driver circuit 306-2 and a second current measurement circuit 308-2, which is a zero current comparator that compares the measured current with zero current value. The third circuit block 324 includes a third power element 304-3, a third driver circuit 306-3 and a third current measurement circuit 308-3, which is a peak current comparator. The fourth circuit block 326 includes a fourth power element 304-4, a fourth driver circuit 306-4 and a fourth current measurement circuit 308-4, which is a zero current comparator. The power elements 304-1, 304-2, 304-3, 304-4 perform similar functions to the power elements 104-1, 104-2, 104-3, 104-4 depicted in FIG. 1. The driver circuits 306-1, 306-2, 306-3, 306-4 perform similar functions to the driver circuit 106 depicted in FIG. 1. The current comparators 308-1, 308-2, 308-3, 308-4 perform similar functions to the regulator controller 108 depicted in FIG. 1. In the embodiment depicted in FIG. 3, out of the four power elements, only the first and second power elements are used in the buck operational mode 202. Out of the four power elements, only the third and fourth power elements are used in boost operational mode 204. In the embodiment depicted in FIG. 3, the power elements are all NMOS devices, such as n-channel MOSFETs.

The bypass switches 312-1, 312-2 of the power supply circuit 300 perform similar functions to the bypass switches 112-1, 112-2 depicted in FIG. 1. In the buck operational mode 202, the first and second power elements 304-1, 304-2 perform the switching operation while the fourth power element 304-4 is configured in the "short" state and the third power element 304-3 is configured in the "open" (non-conducting) state. The external second bypass switch 312-2 is used with the second bypass switch driver 344 to provide a more effective shorting to improve performance of the power supply circuit 300. In the boost operational mode 204, the third and fourth power elements 304-3, 304-24 perform the switching operation while the first power element 304-1 is configured in the "short" state and the second power element 304-3 is configured in the "open" (non-conducting) state. The external first bypass switch 312-1 is used with the first bypass switch driver 342 to provide a more effective shorting to improve performance of the power supply circuit 300. The bypass switches 312-1, 312-2 are optional for scalable buck and/or boost performance. For the basis performance of the power supply circuit, the bypass switches can be completely omitted/removed. In other words, the bypass switches may not be needed for the basis performance of the power supply circuit. For better performance of the power supply circuit, the bypass switches can be added and/or switched on (activated). In addition, different types of bypass switches can be used depending on the required performance enhancement. In the embodiment depicted in FIG. 3, the bypass switches are PMOS devices, such as p-channel MOSFETs.

In the embodiment depicted in FIG. 3, the power supply circuit 300 receives an input voltage signal with an input voltage "$V_{in}$" and an input current "$I_{in}$" through the input terminal 302-1 and a voltage "$V_{cc}$" from a voltage source (not shown) through the input terminal 302-2. The voltage source that supplies the voltage $V_{cc}$ may be internal or external to the power supply circuit. In an embodiment, the voltage $V_{cc}$ is 3.3 volts. The voltage $V_{cc}$ is provided to the second and third driver circuits 306-2, 306-3 to drive the second and third power elements 304-2, 304-3, respectively. The voltage $V_{cc}$ is also provided to the first and fourth driver circuits 306-1, 306-4 via diodes 356, 358 to drive the first and fourth power elements 304-1, 304-4, respectively. With the first and second switching capacitors 330, 334, the switching voltages at the terminals 346-1, 346-6 are raised to a voltage level that is equal to the voltage level $V_{cc}$ applied at the terminal 302-2 plus the voltage levels at the terminals 346-3, 346-7, respectively. The digital controller 328 receives an output voltage setup signal to set a desired output voltage for the power supply circuit 300 through the input terminal 302-3 and a clock signal through the input terminal 302-4. In addition, the digital controller receives an operational mode selection signal to cause the power supply circuit to operate in the buck operational mode 202 or the boost operational mode 204 through the input terminal 302-5 and other control signals, such as Joint Test Action Group (JTAG) interface control signals, through the input terminal 302-6. In an embodiment, the operational mode selection signal can force the power supply circuit 300 to operate only in the buck operational mode, only in the boost operational mode, or to automatically switch between the buck operational mode and the boost operational mode. The power supply circuit 300 also receives a reference voltage "$V_{ref}$" through the input terminal 302-7. The ADC 329 converts the reference voltage $V_{ref}$ into a digital signal and transmits the converted digital signal to the digital controller. In an embodiment, the ADC and the digital controller may be implemented in a single IC chip. The power supply circuit may include more or fewer input terminal(s) to receive more or fewer input signal(s). For example, the power supply circuit may include an internal reference voltage source to provide the reference voltage Vref. In this example, the power supply circuit does not include the input terminal 302-7.

The digital controller 328 of the power supply circuit 300 is configured to generate first, second, third and fourth drive signals and supplies the first, second, third and fourth drive signals to the first, second, third and fourth driver circuits 306-1, 306-2, 306-3, 306-4 to drive the first, second, third and fourth power elements 304-1, 304-2, 304-3, 304-4, respectively. In addition, the digital controller is configured to generate first and second bypass signals and supplies the first and second bypass signals to the first and second bypass switch drivers 342, 344 to switch on and off the first and second bypass switches 312-1, 312-2, respectively. Furthermore, the digital controller is configured to receive first, second, third and fourth control feedback signals from the first, second, third and fourth current comparators 308-1, 308-2, 308-3, 308-4, respectively. The ADC 329 receives an output voltage sense signal through a feedback loop 314 that connects the output terminal 310 to the ADC. The feedback loop is used to regulate the output voltage $V_{out}$ to a desired output voltage. The feedback loop may include one or more resistors (not shown). The ADC converts the output voltage sense signal into a digital signal and transmits the converted digital signal to the digital controller. The digital controller compares the digitalized output voltage with the digitalized reference voltage and switches the corresponding power elements in a chosen operational mode 202 or 204. The first and second switching capacitors 330, 334 and the inductor 332 of the power supply circuit 300 are configured to perform switching function of a switch mode power supply.

Figure 4:
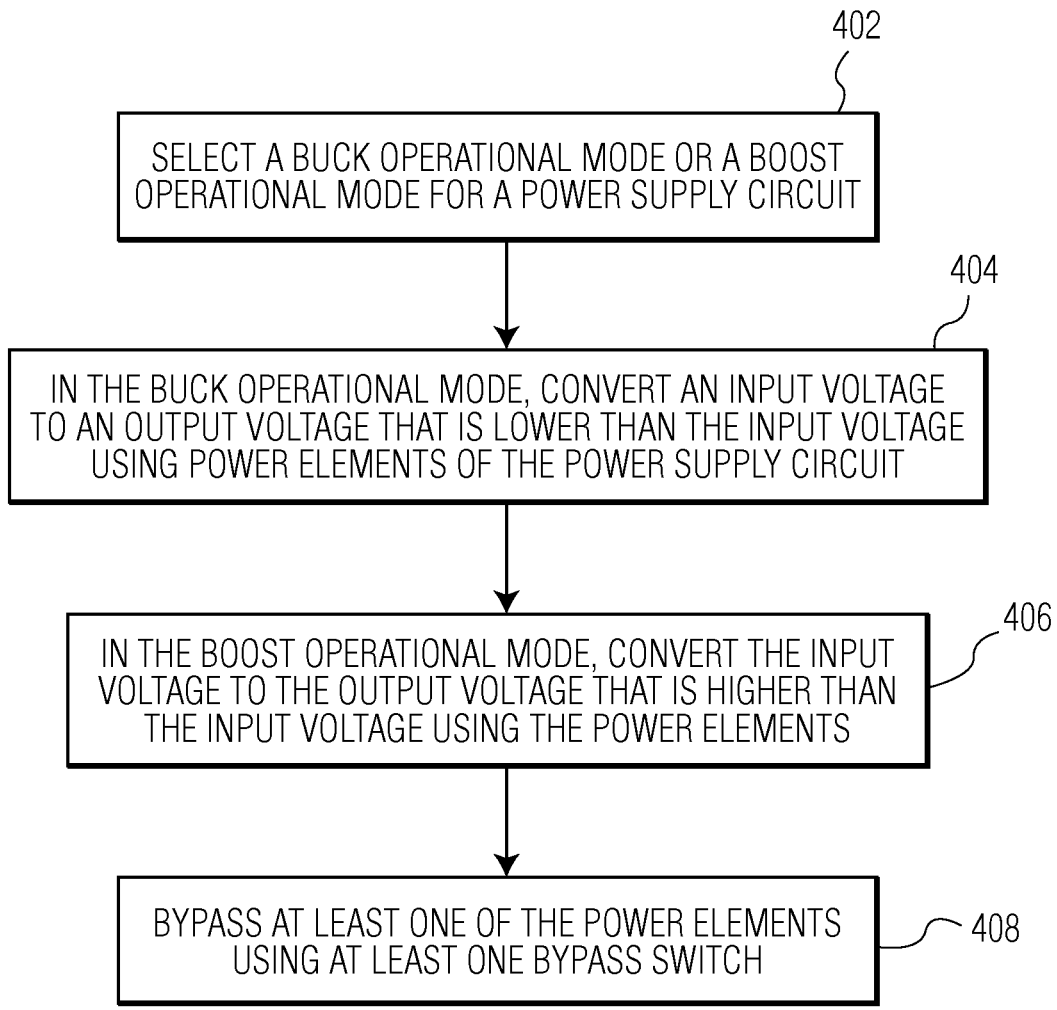
FIG. 4 is a process flow diagram of a method for operating a power supply circuit in accordance with an embodiment of the invention.

FIG. 4 is a process flow diagram of a method for operating a power supply circuit in accordance with an embodiment of the invention. At block 402, a buck operational mode or a boost operational mode is selected for the power supply circuit. At block 404, in the buck operational mode, an input voltage is converted to an output voltage that is lower than the input voltage using power elements of the power supply circuit. At block 406, in the boost operational mode, the input voltage is converted to the output voltage that is higher than the input voltage using the power elements. At block 408, at least one of the power elements is bypassed using at least one bypass switch.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A power supply circuit comprising:
   a plurality of power elements configured to convert an input voltage to an output voltage;
   a driver circuit coupled to the power elements and configured to drive the power elements;
   a regulator controller coupled to the power elements and configured to control the power elements for the conversion of the input voltage to the output voltage; and
   at least one bypass switch coupled to the power elements, wherein the at least one bypass switch is used to bypass at least one of the power elements,
   wherein each of the at least one bypass switch is connected in parallel with only one of the power elements.

2. The power supply circuit of claim 1, wherein the power elements, the driver circuit and the regulator controller are integrated within an integrated circuit chip, and wherein the at least one bypass switch is located outside of the integrated circuit chip.

3. The power supply circuit of claim 1, wherein each of the at least one bypass switch is further configured to be switched on or off only upon operational mode change of the power supply circuit.

4. The power supply circuit of claim 3, wherein each of the at least one bypass switch is further configured such that the on/off status of each of the at least one bypass switch is maintained at the same on/off status while the power supply circuit is operation in the same operational mode.

5. The power supply circuit of claim 3, wherein each of the at least one bypass switch is further configured to bypass one of the power elements that is not needed for the operational mode in which the power supply circuit is operating.

6. The power supply circuit of claim 1, wherein the power supply circuit is configured to operate in a buck operational mode or a boost operational mode, wherein the power elements are further configured to convert the input voltage to the output voltage that is lower than the input voltage in the buck operational mode, and wherein the power elements are further configured to convert the input voltage to the output voltage that is higher than the input voltage in the boost operational mode.

7. The power supply circuit of claim 6, wherein each of the at least one bypass switch is further configured to be switched on or off at transitions between the buck operational mode and the boost operational mode.

8. The power supply circuit of claim 6, wherein each of the at least one bypass switch is further configured such that the on/off status of each of the at least one bypass switch is maintained at the same on/off status while the power supply circuit is operating in the buck operational mode or the boost operational mode.

9. The power supply circuit of claim 6, wherein each of the at least one bypass switch is further configured to bypass one of the power elements that is not needed for the buck operational mode or the boost operational mode in which the power supply circuit is operating.

10. The power supply circuit of claim 1 further comprises:
    an inductor connected to the power elements; and
    a capacitor,
    wherein the power supply circuit is a switch mode power supply.

11. The power supply circuit of claim 10, wherein each of the at least one bypass switch is configured to not switch actively with the current in the inductor.

12. A power supply circuit comprising:
    a plurality of power elements configured to convert an input voltage to an output voltage;

a driver circuit coupled to the power elements and configured to drive the power elements;
a regulator controller coupled to the power elements and configured to control the power elements for the conversion of the input voltage to the output voltage; and
at least one bypass switch coupled to the power elements, wherein the at least one bypass switch is used to bypass at least one of the power elements,
wherein the power elements, the driver circuit and the regulator controller are integrated within an integrated circuit chip, and wherein the at least one bypass switch is located outside of the integrated circuit chip.

13. A power supply circuit comprising:
four power elements configured to convert an input voltage to an output voltage;
a driver circuit coupled to the four power elements and configured to drive the four power elements;
a regulator controller coupled to the four power elements and configured to control the four power elements for the conversion of the input voltage to the output voltage;
a first bypass switch, wherein the first bypass switch is connected in parallel with only a first power element of the four power elements and is used to bypass the first power element; and
a second bypass switch, wherein the second bypass switch is connected in parallel with only a second power element of the four power elements and is used to bypass the second power element.

14. The power supply circuit of claim 13, wherein the power supply circuit is configured to operate in a buck operational mode or a boost operational mode, wherein the four power elements are further configured to convert the input voltage to the output voltage that is lower than the input voltage in the buck operational mode, wherein the four power elements are further configured to convert the input voltage to the output voltage that is higher than the input voltage in the boost operational mode, and wherein each of the first and second bypass switches is further configured to be switched on or off at transitions between the buck operational mode and the boost operational mode.

15. The power supply circuit of claim 14, wherein each of the first and second bypass switches is further configured to bypass one of the first and second power elements that is not needed for the buck operational mode or the boost operational mode in which the power supply circuit operates, and wherein each of the first and second bypass switches is further configured such that the on/off status of each of the first and second bypass switches is maintained at the same on/off status while the power supply circuit is operating in the buck operational mode or the boost operational mode.

16. The power supply circuit of claim 13, wherein the four power elements, the driver circuit and the regulator controller are integrated within an integrated circuit chip, and wherein the first and second bypass switches are located outside of the integrated circuit chip.

17. The power supply circuit of claim 13 further comprises:
an inductor connected to the four power elements; and
a capacitor,
wherein the power supply circuit is a switch mode power supply, and wherein each of the first and second bypass switches is configured to not switch actively with the current in the inductor.

18. A method for operating a power supply circuit, the method comprising:
selecting a buck operational mode or a boost operational mode for the power supply circuit;
in the buck operational mode, converting an input voltage to an output voltage that is lower than the input voltage using a plurality of power elements of the power supply circuit;
in the boost operational mode, converting the input voltage to the output voltage that is higher than the input voltage using the power elements; and
bypassing at least one of the power elements using at least one bypass switch, comprising:
switching on or off each of the at least one bypass switch at transitions between the buck operational mode and the boost operational mode; and
bypassing one of the power elements that is not needed for the buck operational mode or the boost operational mode in which the power supply circuit is operating using each of the at least one bypass switch,
the method further comprising:
adding a bypass switch to the at least one bypass switch; or
removing a bypass switch from the at least one bypass switch.

* * * * *